United States Patent [19]

Moore

[11] 4,120,987
[45] Oct. 17, 1978

[54] AERATED CONFECTIONS

[75] Inventor: Carl Orville Moore, Rochester, Ill.

[73] Assignee: A. E. Staley Manufacturing Company, Decatur, Ill.

[21] Appl. No.: 812,539

[22] Filed: Jul. 5, 1977

[51] Int. Cl.² ............................................. A23G 3/00
[52] U.S. Cl. .................................. 426/572; 426/660; 426/571
[58] Field of Search ................ 426/571, 572, 564, 660

[56] References Cited

U.S. PATENT DOCUMENTS

| | | | |
|---|---|---|---|
| 2,522,050 | 9/1950 | Lenderink | 426/572 |
| 2,588,419 | 3/1952 | Sevall et al. | 426/564 |
| 2,847,311 | 8/1958 | Doumak et al. | 426/571 |
| 3,687,690 | 8/1972 | Moore | 426/660 |
| 3,814,816 | 6/1974 | Gunther | 426/571 |

Primary Examiner—Jeanette M. Hunter
Attorney, Agent, or Firm—M. Paul Hendrickson; Charles J. Meyerson

[57] ABSTRACT

Water-soluble protein hydrolyzates and high-amylose starches provide an improved whipping system for aerated confections such as nougats, grained marshmallow, etc. The total whipping agent and sweetening agent requirements may be sterilized and aerated to a specific gravity of 0.75 or less. The high-amylose starches and protein hydrolyzates are film-formers and provide a supportive matrix for the aerated confections. The aerated confection permits the use of a broad range of sweetening agents without necessarily relying upon crystallized sugars for textural properties. High, moisture-containing, aerated confections with improved stability against moisture-loss may be obtained by substituting crystallizable sugars (e.g. sucrose) with sweetening agents which have a higher degree of humectancy.

21 Claims, No Drawings

AERATED CONFECTIONS

BACKGROUND OF THE INVENTION

Commercial grained, aerated confections are predominantly prepared from an ingredient system comprised of a whipping agent and crystallizable sugars. The whipping agent affords a means for aerating the confection as well as providing a temporary aerated structure for the crystallizable sugars which are ultimately and primarily responsible for its structural integrity and textural character. The ingredient system used in preparing these aerated confections places constraints upon the operable processing conditions and the type of aerated products which may be manufactured.

In general, the whipping agents which have heretofore been used to prepare these aerated confections are essentially intolerant to sterilization temperatures. The aeration, film-forming and/or gelling characteristics of such whipping agents are typically irreversibly impaired or destroyed upon exposure to elevated and heat-denaturizing processing temperatures. As a result, it is conventional to either separately aerate the stabilizer and whipping agent with or without a portion of sugar at relatively low temperatures and then combine the aerated portion with the cooled uncrystallized "bob" or alternatively mix and aerate the ingredients carefully under controlled processing temperatures. Upon cooling and aging, the sugar crystallizes to provide the supportive matrix for the grained, aerated confection.

The trade has generally recognized egg albumin as one of the most effective whipping agents for certain grained, aerated confections such as nougats. Egg albumin creates problems for the nougat manufacturer. On one hand, the nougat manufacturer relies upon a whipping agent which is highly susceptible to microbial infestation and enzymatic contamination (e.g. pathogen adulteration with microbes such as salmonella). On the other hand, the physical and chemical characteristics prevent the nougat manufacturer from processing the egg albumin under heat sterilization temperatures which would effectively alleviate microbial infestation of the finished product. As a result, the nougat manufacturer must take special quality assurance precautions against microbial infestation of the egg albumin raw material as well as during the subsequent processing thereof. For grained marshmallow confections (short, clean-breaking, non-elastic, non-resilient texture in contrast to resilient, stringy texture of ungrained marshmallow), gelation is most commonly used. The problems confronting the manufacturing of these gelatin-containing, grained marshmallow products are similar to those encountered by manufacturers who use egg albumin whipping agents. Aseptic sterilization temperature conditions (e.g., 95° C. or higher for a period of time sufficient to destroy microbial infestation) cannot be effectively utilized for either of these protein whipping agents. Carefully controlled and regulated processing conditions are exercised to preserve the efficacy and quality of the aerated proteins in the manufacture of these grained, aerated confections.

The development of a specific type of sugar crystals is also an essential prerequisite to achieve a high-quality nougat or grained marshmallow confectionary product. The proportion of water to crystallizable sugars must be carefully regulated to insure proper crystal formation. An excess of water adversely results in the formation of large, gritty sugar crystals. A water deficiency fails to provide the desired short texture. The stability and aging properties of the grained, aerated confection is limited by the type of sugars which are required to impart the appropriate short texture and grained structure to the aerated confection. In general, the crystalline sugar requirements for these grained confections results in a confectionary product of limited humectant properties. This arises primarily because the required sugars are inferior humectants. As a result, the grained, aerated confection quality tends to deteriorate as it gradually loses moisture upon normal storage and aging conditions. Attempts to replace or dilute these aerated confections with less costly solid and/or liquid ingredients, without adversely affecting their quality, are not feasible because of inherent recipe constraints.

U.S. Pat. No. 2,588,419 by Sevall et al. discloses aerated confections comprised of whipping agent, a heat-denaturable soy protein, a water-soluble alginate and stabilizer which reacts with the whipping agent. Although Sevall et al. proposes an alternative whipping system, the overall ingredient and its processing conditions are functionally related to gelatin-containing and egg-albumin whipping systems. Similarly, Sevall et al. prepare an uncooked frappe and then conventionally combine the "cooked bob" and the frappe. The Sevall et al. aerated confection predominantly relies upon crystallized sucrose for its body and structure.

My U.S. Pat. No. 3,687,690 affords the soft candy-making art an alternative ingredient system. This system relies heavily upon a high-amylose starch for its structure and texture. The patent discloses and claims confections comprised of high-amylose starch, water and sweetening agents. Due to the functionality of the high-amylose starch, confections which are predominantly comprised of corn syrup are feasible with this recipe system. The patent examples illustrate a two-stage method involving the preparation of frappes for creme centers by separately whipping a soy protein hydrolyzate, water, corn syrup and powdered sugar into a frappe, cooling the frappe and then combining the cooled frappe with a cooled "bob" comprised of the high amylose starch and the remaining portion of the sweetening agent.

OBJECTS

It is an object of the present invention to provide an improved single-stage method for preparing aerated confections.

Another object of the invention is to provide novel and improved aerated confections wherein the ingredients may more easily be altered to achieve a desired textural effect without adversely affecting the desired character of the finished product.

An additional object is to provide an aerated confection which does not require a matrix of crystalline sugars for structural support and short textural qualities.

DESCRIPTION OF THE INVENTION

The present invention relates to an improvement over the grained, aerated confections which heretofore have been made from recipe ingredients comprised of whipping agents, a whipping agent stabilizer and sugar. The aerated confection of this invention simulates the textural and eating qualities of aerated and grained confections without necessitating crystalline sugars of a short texture. The improved aerated confection relies upon a recipe comprised of a sweetener, a high-amylose starch and an undenatured water-soluble protein hydrolyzate. Unlike conventional grained, aerated confections, the present aerated confections do not require either crystallized sucrose or gelled or heat-denatured proteins for body and structural support (e.g., matrix) in the finished product. In the present recipe, the high-amylose starch is predominantly responsible for the cohesiveness and structural integrity of the finished product since the remaining ingredients may be provided therein either in the water-soluble or microcyrstalline form. The undenatured, water-soluble, film-forming, protein hydrolyzate in combination with the high-amylose starch provides a means for homogeneously and uniformly ingesting gas and maintaining the ingested gas in the form of minute gas bubbles within the aerated confection at elevated temperatures. At reduced temperatures (e.g., less than 80° C. and aging), the homogeneously dispersed high-amylose starch converts to a retrograded starch to provide structural support and cohesiveness for the finished aerated confectionary product.

The protein hydrolyzates employed herein are characterized as being water-soluble over a broad temperature range (e.g., 25° C.–180° C.) and pH range (e.g., 4–8). These protein hydrolyzates have a capacity to ingest and maintain the ingested gas homogeneously dispersed throughout the aerated confection at temperatures between 25° C.–110° C. Unlike egg albumin and the higher molecular weight soy proteins which have heretofore been suggested as a gelatin replacement, the protein hydrolyzate used in the invention will not undergo irreversible, heat-denaturization or coagulation at temperatures in excess of 95° C. for 10 minutes or longer. These protein hydrolyzate characteristics are important to the aerated confection manufacturer since it permits the manufacturer to aseptically process the major aerated confection ingredients at temperatures which would normally be expected to thermally heat-denature or irreparably destroy the efficacy of the whipping agent in conventional aerated confection ingredient systems. Moreover, the processing time and uniformity of the ingested gas are significantly improved because the entire mass can be effectively aerated at temperatures and viscosity conditions most suitable for gas ingestion.

Although a wider variety of protein hydrolyzates having the characteristics as defined herein may be used, it is advantageous to employ protein hydrolyzates which have a low sulfur-containing amino acid cotent (e.g., cysteine, methionine, etc.), particularly those containing less than 1% sulfur-containing amino acids and preferably less than 0.5% by weight. Vegetable protein hydrolyzates such as those derived from leguminous sources (e.g. peanuts, cottonseed, soybean, etc.) are particularly useful for this purpose. As previously mentioned, the chain length of the protein hydrolyzate should be reduced sufficiently so that it will not heat-denature under the high processing temperatures used to cook (e.g., 160° C.) the recipe. It is essential, however, for the protein hydrolyzates not to be excessively hydrolyzed to such an extent that they no longer possess the necessary film-forming and gas ingestion properties. The soy protein hydrolyzates disclosed in U.S. Pat. No. 3,814,816 are particularly effective whipping proteins. These proteins are commercially available and may be prepared by initially chemically hydrolyzing the soy protein to a prescribed viscosity range and thereafter enzymatically hydrolyzing the soy protein with pepsin. Alternatively the protein hydrolyzate may be derived from certain water-soluble fractions which are isolated and partitioned from the higher-molecular weight, isoelectric precipitated heat-denaturable proteins. Vegatable protein hydrolyzates which are characterized as possessing film-forming properties sufficient to permit gas ingestion into recipe formulations provided herein and water-soluble throughout the pH 4.0–7.0 range at a 20% concentration (i.e., 10% dry solids weight in 90% by weight water) are especially suitable for use as a whipping protein.

In addition to the whipping agent, the aerated confections of this invention contain a high-amylose starch. As commonly understood by the art, the high-amylose starches are predominantly comprised of amylose and may contain amylopectin as a minor starch component. Such high amylose starches may be obtained from fractionation processes wherein the amylose starch content is enriched by amylopectin separation to provide an amylose fraction containing at least 50% amylose to one which is substantially free from amylopectin (e.g., 100% amylose). Most commonly, the high-amylose starches are derived from high-amylose corn hybrids (e.g., 50%, 55%, 70%, 75%, etc.). In general, the high-amylose starches are insoluble in boiling water at atmospheric pressure and require superatmospheric pressures and elevated temperatures (e.g. higher than 110° C.) for homogeneous dispersal or dissolution into aqueous mediums. These homogeneously dispersed or dissolved high-amylose molecules possess film-forming properties and will form a matrix for the aerated confection ingredients upon cooling to temperatures below their congealing temperature. The protein gas ingestion and retention properties are significantly improved because the high-amylose starch contributes desirable film-forming and viscosity functionality to the recipe during its aeration. It further facilitates uniform entrapment of minute gas bubbles within aerated confections upon congealment of the high-amylose starch.

The invention generally contemplates modified and unmodified high-amylose starches which homogeneously disperse into the aqueous medium and congeal upon cooling under the recipe conditions herein. Illustrative high-amylose starches include those disclosed in U.S. Pat. Nos. 3,987,210 and 3,687,690. High-amylose starch hydrolyzates (e.g., enzymatic or acid-thinned) having an alkali fluidity of about 20cc to 90cc and preferably between about 50cc to about 80cc (e.g., see my U.S. Pat. No. 3,687,690) are especially useful in the recipe formulations of this invention.

Whipping agent stabilizers, such as conventionally used in amounts (typically at about 0.01% to about 20.0% by weight of whipping agent dry weight) sufficient to facilitate the ingestion and incorporation of a gas into whippable compositions may also be used. Those stabilizers conventionally used to stabilize protein whipping systems are particularly effective. The mono- and polyphosphorous acid and salt sequestrants (e.g., meta-, ortho-, pyro-, tri-, tetra-, penta-, hexa-, etc. phosphoric acids and their salts) may be used for this purpose (e.g., see Handbook of Food Additives, CRC 2nd Edition, pages 661–674 and 744–754). Exemplary phosphorus containing sequestrants for proteins include the ammonium, alkaline earth (e.g., calcium, etc.), alkali (e.g., potassium, sodium, etc.) salts of phosphates and polyphosphates such as trisodium pyrophosphate (TSPP), sodium hexametaphosphate (SHMP), potassium triphosphate (KTP), trisodium phosphate (TSP), tripotassium pentaphosphate (TKPP), disodium phosphate (DSP), sodium tetrapolyphosphate (STPP), mixtures thereof and the like. Functionally, the whipping stabilizers improve the protein hydrolyzate dispersibility and solubility in high solids aqueous mediums, increases its water-bonding and gel formation properties, its whipping properties, form complexes with the protein and may possibly interact with the starch to provide protein-starch or starch complexes in the finished product.

A broad range of sweeteners may be used. Unlike conventional grained, aerated confections, it is unnecessary to rely upon a supportive matrix of grained or crystallized sugars. The whipping protein, high-amylose ingredient system, with or without a crystallizable sugar provides the necessary supportive and cellular structure in the finished product. The sweetening agent concentration and sweetener type can be altered to suit its function in the desired end-product. In general, the sweetening agents may broadly range from those of a higher sweetening power (e.g., non-nutritive sweeteners such as saccharin, cyclamates, dipepties, chalcones, etc.) to weak sweeteners (e.g., low D.E. starch hydrolyzates, polysaccharides of $D.P._3$ and higher, etc.). Either crystallizable or non-cystallizable sweetening agents may be freely interchanged, as desired, in the aerated recipe.

The recipe versatility and compatibility with divergent sweeteners affords a means for altering its textural properties. The gel-character, tenderness, moisture content, grain, firmness, etc. can be changed by sweetener type and/or its concentration. The sweetening agent may be selected from a variety of reducing and non-reducing processed carbohydrate sources including the fermentable saccharides (e.g., mono-, di and trisaccharides) as well as the non-fermentable saccharides ($D.P._4$ and higher). Illustrative saccharide sweetening agents include dextrose, lactose, fructose, sucrose, maltose, maltotriose, xylose, $D.P._4$ and higher saccharides (e.g., maltodextrin), mixtures thereof and the like. Less expensive corn syrup and maltodextrin (e.g., D.E. 10-100) may be used to replace more costly sugars such as sucrose. Saccharide sweeteners having an equivalent or higher sweetening power than sucrose (e.g., fructose) may also be used at lower concentrations to achieve a comparable level of sweetness. The water-retention properties of the aerated confection can be significantly improved by utilizing more humectant saccharides. Illustrative saccharide sweeteners which impart improved humectant properties to the present aerated confections include the reducing mono- and disaccharides such as fructose, dextrose, maltose, conversion syrups rich in humectant saccharides, mixtures thereof and the like. Improved storage stability (e.g., moisture depletion by drying and aging), packaging and enrobing ingredient cost reduction, mouth-feel, moistness, tenderness, shortgel character as well as the ability to replace a significant portion of the costly confection solids with water (without detracting from its overall high quality) are now made possible by the aerated recipes of this invention.

The present invention provides an improved method for preparing aerated confections which simulate the textural character of grained, aerated confections. The matrix of these confections do not require a crystallized sugar in order to achieve the textural properties for the grained confections.

The aerated confections of this invention are prepared by a method which comprises: (a) forming an aerated aqueous dispersion having a specific gravity of less than 0.75, said aerated aqueous dispersion comprising a continuous, homogeneous external aqueous film phase and a discontinuous internal phase of minute gas bubbles homogeneously dispersed and entrapped by the continuous film phase, said continuous external film phase comprising a homogeneous film of water-soluble protein hydrolyzate and gelatinized high-amylose starch uniformly dispersed in water and (b) cooling the aerated aqueous dispersion to a temperature below the congealing point of high-amylose starch to congeal the high-amylose starch within the external phase to provide a solid, aerated confection having a specific gravity of less than 0.75. An essential embodiment of the present invention is to provide an aerated structure having specific gravity less than 0.75 wherein both the water-soluble protein hydrolyzate and the high-amylose starch form a homogeneous, continuous external film phase with the ingested and entrapped gas phase therein. To achieve a homogeneous external phase, it is necessary to homogeneously combine the high-amylose starch, the water-soluble protein hydrolyzate and the ingested gas into the recipe before the gelatinized high-amylose starch (i.e., dissolved or dispersed starch) congeals and reverts to its water-insoluble form.

It is necessary to initially cook the high-amylose starch in the presence of water under superatmospheric pressure and temperatures in excess of 100° C. (e.g., steam cooking such as by retort or jet cooking), to uniformly and homogeneously disperse the high-amylose starch into an aqueous dispersion (frequently referred to by the art as gelatinization). The superatmospheric cooked and homogeneously dispersed high-amylose starch will congeal at temperatures below 100° C. to form a water-insoluble starch film. The high-amylose starch congealing rate and temperature will depend upon its concentration, the concentration of congealing inhibitors (monosaccharides, disaccharides, etc.), the time interval and temperature degrees the starch is maintained below its congealing point, the amount of agitation and other factors know to affect the congealing temperature of gelatinized high-amylose aqueous dispersions.

In combination with the protein hydrolyzate and/or sweetening agent, the homogeneously dispersed high-amylose has an excellent pot-life at elevated temperatures. The inherent tendency of the high-amylose to retrograde and form water-insoluble starch particles is effectively retarded by the presence of the water-soluble protein and sweetener recipe ingredients. Consequently the recipe can be ingested with gas and shaped into the desired form under conditions well-suited for continuous nougat or grained marshmallow confectionary manufacture. After the recipe has been aerated, it possesses sufficient structural strength, cohesiveness and gas-entraining properties to resist compaction and gas void destruction to permit its adaptation to further mechanical working and extrusion over a relatively broad temperature range. The superior recipe film-forming and gas-entraining properties are apparently responsible for these unique working and functional attributes.

The water-soluble protein hydrolyzate contributes to gas ingestion. The aeration is necessarily conducted in the presence of the protein with or without the remaining aerated confection recipe ingredients. The high-amylose starch may be incorporated into the recipe formulation at any stage before it retrogrades to a water-insoluble form. Advantageously, the high-amylose starch is precooked along with the water-soluble protein hydrolyzate at superatmospheric pressures and then aerated. Alternatively, the water-soluble protein hydrolyzate may be aerated separately with the gelatinized high-amylose starch being homogeneously incorporated into the aerated protein portion. In either case, the aerated mass necessarily contains both the water-soluble protein and high-amylose starch uniformly and homogeneously dispersed throughout the aerated mass. At temperatures in excess of 90° C., the water-soluble protein and water-soluble high-amylose starch can generally be homogeneously intermixed or aerated without too much danger of encountering premature insolubilization of the high-amylose starch. Mixing conditions or aeration involving temperatures of less than 80° C. without congealing inhibitors (e.g., saccharide sweeteners) generally necessitates a shorter time interval to achieve the required high-amylose and water-soluble protein external phase homogenity.

The sweetening agents may be incorporated into the recipe before or after the formation of the aerated, high-amylose and water-soluble protein mass. If the sweetening agent incorporation is delayed until after the aerated mass is prepared, it is advantageous to incorporate at least a major weight portion of the total sweetening agent recipe requirements into the aerated mass before the high-amylose starch congeals to its water-insoluble form. The overall quality of the aerated confection and the ease of its preparation is significantly improved by cooking and dissolving at least a major portion (preferably at least 85% and most preferably at least 90%) of the total recipe sweetening agent into the recipe along witth the water-soluble protein and high-amylose starch, followed by aerating the mass at a temperature of at least 40° C. (preferably between about 50° C. to about 110° C.) to provide an aerated confection having a specific gravity of less than 0.75. Thermal sterilization can be effectuated by incorporated to total sweetening agents recipe requirements, and cooking it along with the high-amylose and water-soluble protein at temperatures ranging from about 90° C. to about 180° C.

Overall recipe performance is improved by incorporating the sweetening agent into the recipe, prior to its aeration. The sweetening agents impart a short-texture and plasticize the amylose-protein film-former, and thus enhance its film elongation, cohesive and elasticity properties. This permits a more uniform ingestion, encapsulation and retention of minute gas bubbles within its aerated matrix. The gas cells are stabilized against syneresis, collapse and migration by the plasticized film. These aerated structures possess excellent resistance against mechanical and physical attrition with sufficient flow and gas encapsulation properties for use in extrusion manufacturing processes. These aerated confection characteristics provide a greater latitude in those manufacturing operations occurring after the confection has been aerated.

Broadly, the aerated confections of this invention may contain from about 25-250 parts by weight saccharide sweetners (lesser amounts for nonnutritive sweeteners wherein the level is dictated by its sweetening power); and from about 2-20 parts by weight high-amylose for each part by weight water-soluble protein. For most recipes simulating the texture and quality of a grained marshmallow or nougat, the recipe will typically contain from about 50-175 parts by weight sweetening agent (preferably about 75-150 parts by weight) and from about 3 to about 15 parts high amylose (preferably about 5 to about 10 parts by weight) for each part by weight whipping protein hydrolyzate. The amount of water provided in the recipe formulation should be sufficient to dissolve the water-soluble protein, high-amylose, sweetening agent recipe components and to provide a short-textured, aerated confection upon solidification by cooling. Typically the amount of water untilized in preparing the aerated confections herein will range from about 15 to about 40 prts by weight for each 100 parts by weight of dissolved solids. Preferably, the amount of water used to dissolve the recipe ingredients will comprise from about 20 to about 30 weight percent of the confectionary dry solids weight. After the solid recipe ingredients have been homogeneously dispersed or dissolved into the aqueous phase, the recipe is advantageously concentrated to at least a 75% by weight solids level and preferably to about 80 to about 90 while retaining the solids homogeneously therein (e.g., at elevated temperatures). The invention affords a means for providing prepared aerated confections which contain from about 1-5% more water than conventional nougat and marshmallows (e.g., 10 to 20% moisture vs. conventional levels of about 10 to about 14%).

Other conventional additives such as flavoring, coloring agents, microbides, antioxidants, acidulants, humectants, fats, oils, surface active agents, gums, starches, solid or particulated foods (e.g., nuts, etc.), and the like may be incorporated into the recipe, provided they do not destroy the aerating characteristics of the whipping components. The textural quality of the aerated confection may be modified (e.g., made more chewy or more tender) by the recipe addition of other edible hydrophilic film-formers such as dextrin, carboxymethyl cellulose, hydroxypropyl cellulose, hydroxyethyl cellulose, pregelled starches, (e.g., corn starch, potato starch, waxy maize starch, inhibited starch, the gelatin and heat-denatured protein, etc.) in minor amounts (e.g. less than 5 parts by weight). The aerated confection chewiness and toughness may be increased by either increasing its amylose content or by incorporating heat-denaturable proteins into the external phase.

The aerated confections are ingested with a suffcent amount of gas to provide a finished confection having a specific gravity of less than 0.75 (i.e., less 0.75 gms/ml.). Conventional, non-toxic, aerating gases (e.g., carbon dioxide, nitrogen, air, etc.) may be used. The aeration may be conducted batch-wise or continuously in conventional aerating equipment such as Hobart mixers, Savage beaters, Votators, Oakes mixers, etc. Due to the properties of the protein hydrolyzates and high-amylose starch, it is advantageous to aerate the dissolved protein hydrolyzate, sweetening agent and high-amylose starch at temperatures ranging from about 55° C. to about 80° C., shape it into the desired form while it still retains sufficient plasticity to be shaped and thereafter allow the aerated mass to cool and solidify. If it is desired to preform the aerated confection in a nonpressurized shaping operation (e.g., molding, slabbing, deposition into molding starches, pouring onto a continuous belt, etc.) the prefabrication step thereof is advantageously completed before the aerated confection cools and solidifies. For pressurized prefabrication operations (e.g., calendaring, extrusion into a continuous bed of starches etc.), the aerated mass has sufficient strength to retain its structural and aerated integrity to permit further processing thereof after it has cooled and solidified. It is preferred, however, to preform the aerated mass into the desired configuration while still in the plastic form. The aerated confection can be easily prefabricated into the desired shape above the congealing temperature of the high-amylose starch. If desired, the cooled aerated confection can be manually cut. The preformed aerated confection may be dusted and enrobed with conventional enrobing coatings. When the aerated confections are provided with the appropriate balance of humectant sugars they are considerably much more stable against moisture loss than conventional aerated confections.

The following Examples illustrate the invention.

EXAMPLE 1

An aerated confection with a short texture similar to a traditional soft, short-grained nougat was prepared from the following recipe ingredients:

| Ingredients | Parts By Weight |
|---|---|
| I. Base Formula | |
| High fructose corn syrup[1] | 62.5 |
| High maltose corn syrup[2] | 52.5 |
| Acid-hydrolyzed high-amylose starch[3] | 7.5 |
| Water-soluble soy protein hydrolyzate whipping protein[4] | 1.0 |
| Water | 2.0 |
| II. Post Additives | |
| Low-fat cocoa powder | 2.5 |
| Imitation vanilla flavor | .25 |

[1] ISOSWEET 180, manufactured and sold by A. E. Staley Manufacturing Company (42% fructose, 50% dextrose, 1.5% maltose, 1.5% isomaltose, 5% higher saccharides at 80% solids).
[2] NETO 7350, manufactured and sold by A. E. Staley Manufacturing Company (81% solids, 46% maltose, 10% dextrose, 24% $DP_3$ and 20% $DP_4$ and higher).
[3] MIRA-CREME modified high amylose starch, manufactured and sold by A. E. Staley manufacturing Company (acid-hydrolyzed 55% amylose starch, 11.5% moisture and 60 ml. alkaline fluidity).
[4] Gunther D-100 manufactured and sold by A. E. Staley Manufacturing Company (62% protein, 16% carbohydrate, 24% moisture)

The base formula ingredients were slurried at 95° C. and jet cooked (e.g. see U.S. Pat. No. 3,687,690) under superatmospheric pressure and steam injection at 166° C. evaporated to 83% solids (at 112° C.), cooled in a Votator to 54.4° C., and immediately whipped to a density of 4 pounds/gal. (0.48 specific gravity) in an Oakes mixer. In a holding kettle the post additives were homogeneously mixed into the aerated nougat and the aerated mixture was extruded through a die into the desired shape onto a flour dusting conveyor equipped with a cutter. The dusted nougat extrudates were then enrobed with a chocolate coating.

The resultant nougat contained 16.5% water which is between about 2.5% to about 6.5% more water than conventional nougat recipes. Due to humectant properties of the recipe, the uncoated nougat possessed significantly improved stability against both moisture loss and textural changes (e.g. undesirable graininess development and dryness) upon storage and aging. In addition to a higher moisture content, the overall ingredient system was significantly less costly than traditional nougat recipes. Since the entire base formula was cooked under thermally sterilizing processing conditions and the whipping system was free from microbial contamination, a sterilized nougat was obtained. The cooked and cooled aerated nougat recipe has excellent quick setting properties without being adversely affected by subsequent mechanical working of the recipe. The cooked base formula also has excellent pot-life prior to whipping and could be aerated to a density of 3-4 pounds/gallon at temperatures from about 45° C. to about 105° C. under continuous pressure cooking. The whipped confection sets rapidly while retaining its desired configuration thereby permitting subsequent coating, dusting and enrobing operations to continue without prolonged post curing.

EXAMPLE 2

A nougat was prepared from the following ingredients:

| Ingredients | Grams | % D.S.B. |
|---|---|---|
| Corn syrup[5] | 43800 | 92 |
| Whipping protein[6] | 400 | 1 |
| Amylose hydrolyzate[7] (MIRA-QUIK CHG) | 3080 | 7 |
| Water | 1600 | — |
| Flavor and color | — | — |

[5] SWEETOSE 4400 (DE 64%, 39% dextrose, 33% maltose, 12% maltotniose, 16% D.P.$_4$)
[6] Gunther D-100, manufactured and sold by A. E. Staley Manufacturing Company (62% protein, 16% carbohydrate, 24% moisture)
[7] MIRA-CREME modified high amylose starch, manufactured and sold by A. E. Staley Manufacturing Company (acid-hydrolyzed 55% amylose starch, 11.5% moisture and 60 ml. alkaline fluidity).

Procedure: Disperse whipping protein in water, add corn syrup and starch, mix and heat to 200° C. Jet cook at 335° F. to obtain a hot cooked product at approximately 80% solids, 220° F. Whip immediately using 3000 gms. of the cooked product in 11-quart Hobart mixer fitted with a wire whip on speed #3 to produce a product density of about 3-4 lbs/gal. in 6 minutes whipping time. If desired, 6% cocoa may be added at this point and slowly folded in for color and flavoring purpose. The freshly whipped material (at 140-150° F.) was suitable for pouring onto lubricated trays, cooled for about 10-15 minutes and then stripped free from the tray in a gelled slab which can be manually cut into the desired piece size. The resultant nougat had properties similar to those obtained in Example 1.

The capacity of the aerated confection to ingest and maintain ingested gas into the aerated structure in a stable form permits one to prepare confections over a relatively broad specific gravity range (e.g., 0.25-0.75). A majority of the confections, however, will most generally have a specific gravity ranging from about 0.30 to about 0.60 with a specific gravity ranging from about 0.35 to about 0.50 being most preferable.

The most suitable recipe superatmospheric cooking temperatures are between about 145° C. to about 180° C. (preferably about 150° C. to about 160° C.). The most suitable solids levels for aerating are between about 75% to about 90%. The aerating may suitably be conducted at temperatures below the recipe boiling point (e.g., 40° C. to about 115° C.) and preferably between about 50° C. to about 85° C.

I claim:

1. Aerated confection having the textural and eating qualities of grained, aerated confections, said aerated confection comprising:
   (a) a continuous, stable homogeneous external aqueous film phase comprising from about 10% to about 25% by weight water, from about 25 to about 250 parts by weight sweetening agent, one part by weight water-soluble protein hydrolyzate characterized as being soluble in water throughout the pH 4-7 range at a 20% dry solids concentration and from about 2 to about 20 parts by by weight high-amylose starch uniformly dispersed throughout said film phase, and (b) a discontinuous internal phase of minute gas bubbles homogeneously dispersed and entrapped by the continuous external film phase in an amount sufficient to provide an aerated confection having density of less than 0.75 gms/ml.

2. An aerated confection according to claim 1 wherein the water-soluble protein comprises a vegetable protein hydrolyzate characterized as being soluble in water throughout the pH 4.0–7.0 range at a 20% dry solids concentration and stable against heat-denaturization at temperatures between 25° C.–180° C.

3. An aerated confection according to claim 1 wherein the confection comprises from about 75 to about 150 parts by weight saccharide sweetening agent and from about 3 to about 15 parts by weight high-amylose starch for each part by weight protein hydrolyzate.

4. An aerated confection according to claim 1 wherein the moisture content of the confection ranges from about 15% to about 20% by weight and the confection has a specific gravity ranging from about 0.30 to about 0.60.

5. An aerated confection according to claim 2 wherein the protein hydrolyzate consists essentially of soy protein hydrolyzate and the highamylose consists essentially of a high-amylose hydrolyzate having an alkali fluidity between about 50cc to about 80 cc.

6. An aerated confection according to claim 5 wherein the confection comprises from about 75 to about 150 parts by weight saccharide sweetening agent and from about 5 to about 10 parts by weight high-amylose starch for each part by weight protein hydrolyzate.

7. The aerated confection according to claim 6 wherein the aerated confection is characterized as having the textural and eating qualities of a nougat.

8. The confection according to claim 7 wherein the water content of the aerated confection ranges from about 5 to about 20% by weight.

9. The aerated confection according to claim 6 wherein the aerated confection is characterized as having the textural and eating qualities of a grained marshmallow.

10. The confection according to claim 9 wherein the water content of the aerated confection ranges from about 15% to about 20% by weight.

11. An aerated confection according to claim 6 wherein the moisture content of the confection ranges from about 10% to about 20% by weight and the confection has a specific gravity ranging from about 0.30 to about 0.60.

12. A method for preparing aerated confections to simulate the textural character of aerated grained confections, said method comprising:

(a) forming an aerated aqueous dispersion having a specific gravity of less than 0.75 and a water content of about 10% to about 25% by weight wherein said aerated aqueous dispersion comprises a continuous homogeneous external film phase of water, one part by weight water-soluble protein hydrolyzate characterized as being soluble in water throughout the pH 4–7 range at a 20% dry solids concentration, from about 25 to about 250 parts by weight sweetening agent and from about 2 to about 20 parts by weight high-amylose starch uniformly dispersed in said water; and a discontinuous internal phase of minute gas bubbles homogeneously dispersed and trapped within said continuous external film phase and (b) cooling the aerated aqueous dispersion to a temperature below the congealing point of high-amylose starch to congeal the high-amylose starch in said external phase to provide a stable, aerated confection.

13. The method according to claim 12 wherein the aqueous dispersion is prepared by cooking the high-amylose starch and protein hydrolyzate under superatmospheric pressures at a temperature between about 145° C. to about 180° C. and the cooled aerated confection product has a specific gravity of less than 0.75.

14. The method according to claim 13 wherein the cooked dispersion comprises from about 15 to about 40 parts by weight water, about 75 to about 150 parts by weight sweetening agent and about 3 to about 15 parts by weight high-amylose for each part by weight protein hydrolyzate.

15. The method according to claim 4 wherein the cooked aqueous dispersion is aerated to a specific gravity ranging from about 0.3 to about 0.6 at a temperature between about 40° C. to about 115° C.

16. The method according to claim 12 wherein the soluble protein comprises a vegetable protein hydrolyzate characterized as being soluble in water throughout the pH 4.0–7.0 range at a 20% dry solids concentration and stable against heat-denaturization at temperatures between 25° C.–180° C.

17. The method according to claim 16 wherein the aqueous dispersion comprises from about 75 to about 150 parts by weight saccharide sweetening agent and from about 5 to about 10 parts by weight high-amylose starch for each part by weight protein hydrolyzate.

18. The method according to claim 17 wherein the protein hydrolyzate consists essentially of soy protein hydrolyzate and the high-amylose consists essentially of a high-amylose hydrolyzate having an alkali fluidity between about 50 cc to 80 cc.

19. The method according to claim 18 wherein the aqueous dispersion is cooked under superatmospheric pressures at temperatures between about 145° C. to about 180° C. and the cooked aqueous dispersion is aerated at a dry solids concentration ranging from about 80% to about 90% by weight to a specific gravity ranging from about 0.35 to about 0.5.

20. The method according to claim 19 wherein at least a major portion of the sweetening agent comprises a starch saccharide hydrolyzate having from 1 to 3 saccharide units per molecule.

21. The method according to claim 20 wherein the aqueous dispersion containing from about 80 to about 85% by weight dry solids is aerated.

* * * * *

UNITED STATES PATENT AND TRADEMARK OFFICE
CERTIFICATE OF CORRECTION

PATENT NO. : 4,120,987

DATED : October 17, 1978

INVENTOR(S) : Carl Orville Moore

It is certified that error appears in the above-identified patent and that said Letters Patent are hereby corrected as shown below:

Abstract, line 9, for "confection permits" read ---confection recipe permits---
Column 2, line 23, for "to gelatin" read ---to the gelatin---
Column 2, line 66, for "of" read ---for---
Column 3, line 10, for "microcyrstalline" read ---microcrystalline---
Column 3, line 48, for "cotent" read ---content---
Column 4, line 8, for "10%" read ---20%---
Column 4, line 9, for "90%" read ---80%---
Column 7, line 35, for "witth" read ---with---
Column 7, line 40, for "incorporated to" read ---incorporating the---
Column 8, line 10, for "untilized" read ---utilized---
Column 8, line 11, for "prts" read ---parts---
Column 10, footnote 5, for "maltotniose" read ---maltotriose---
Column 10, line 52, for "aerating" read ---aeration---
Column 11, line 41, for "5 to about 20%" read ---15 to about 20%---
Column 12, line 27, for "4" read ---14---
Column 12, line 47, for "to 80 cc" read ---to about 80 cc---

Signed and Sealed this

Eighth Day of May 1979

[SEAL]

Attest:

RUTH C. MASON
Attesting Officer

DONALD W. BANNER
Commissioner of Patents and Trademarks